April 6, 1954

H. HEINE 2,674,157

PHASE MICROSCOPE

Filed Dec. 28, 1949

INVENTOR.
HERMANN HEINE
BY
Fred A. Klein.
ATTORNEY

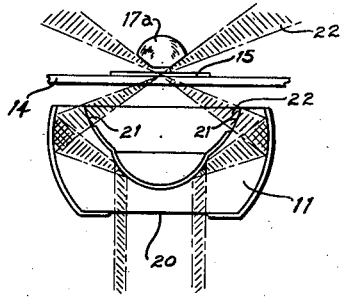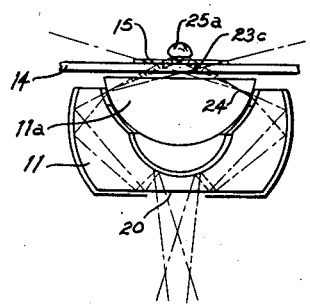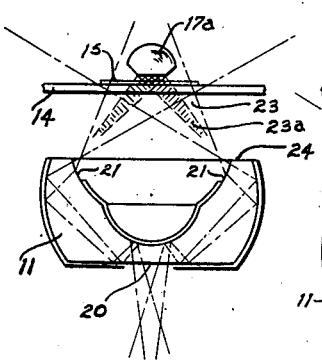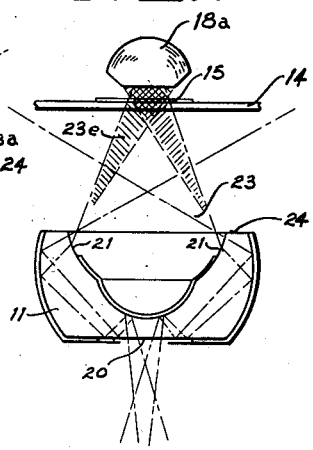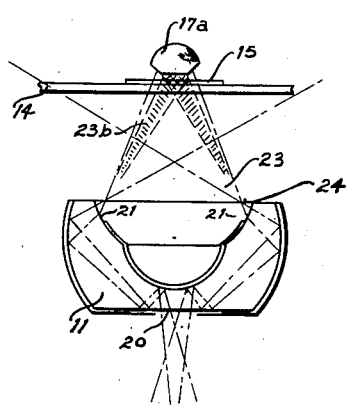

UNITED STATES PATENT OFFICE 2,674,157

PHASE MICROSCOPE

Hermann Heine, Wetzlar, Germany, assignor to Ernst Leitz, G. m. b. H., Wetzlar, Germany, a corporation of Germany Application December 28, 1949, Serial No. 135,510

Claims priority, application Germany August 15, 1949

6 Claims. (Cl. 88—39)

The present invention relates to phase microscopes, and more particularly to an improved phase contrast method of viewing objects and an optical system adapted to practice such method.

Various phase contrast methods have previously been suggested but all known arrangements entail considerable complications in apparatus and operation. It is, therefore, a principal object of this invention to provide a method and apparatus for producing phase contrast which is simple in construction and easily adaptable to different objectives as well as to a successive observation of an object first in a dark-field, then by phase contrast and finally in an ordinary bright-field.

In the known phase contrast methods, the condenser has a relatively large annular diaphragm through which the light passes and its image in the exit pupil of the objective may be considered a geometrical-optical image if the diffraction by the object is neglected and only that by the objective frame is taken into consideration. In accordance with the present invention, the annular condenser diaphragm forming the base from which the illuminating light bundles are thrown upon the object is so narrow that the image of the annulus on the exit pupil of the objective is determined essentially by diffraction. This diffraction phenomenon may be of such nature that it may be possible to discern clearly, besides the principal maximum appearing as a bright narrow ring, one or more concentrically arranged accessory maxima.

In one embodiment of the invention, the desired phase difference between the illuminating and the diffracted light beams may be obtained by a concentrically arranged diaphragm adapted to cover partially the radial extension of the annular diffraction image of the base in the exit pupil. In another embodiment, the wave front of the objective in the exit pupil may be so different from the spherical shape that the state of correction in that zone of the objective where the diffraction image of the base lies assume a positive or negative extreme value.

To practice the phase contrast method in accordance with the first-mentioned embodiment, there is required, besides the condenser, an objective having part of its aperture permanently covered, preferably so that within the uncovered aperture the aberrations of the objective meet the Rayleigh-condition (wave distortion less than ¼ of the wavelength). By moving the condenser toward, or away from the object, the annular diffraction image of the base may be focused upon the rim of the objective aperture and be partially covered there. It is also possible to use an objective having an iris diaphragm (Fig. 1b) near the exit pupil and to obtain the proper focusing of the diffraction image of the base upon the rim of the stop of the objective by the adjustment of the distance of the condenser from the objective. This permits a considerable range in the variation of the phase contrast. It is also possible to provide a fixed, annular absorbent stop in the exit pupil of the objective, for example by lacquering a surface of a disk in the exit pupil, and to cover a part of the annular diffraction image at its outer or inner edge by suitably moving the condenser in relation to the object.

The images obtained by the use of any of the above devices show positive or negative phase contrast according to whether the partial covering of the diffraction image takes place at the outer or inner edge of the annular stop.

The present invention may also be practiced in connection with an objective mounted in a corrective holder, which, in a manner known per se, permits the adjustment of the relative distances of the various lens groups of the objective. With such an objective it is possible to produce the aberrations required to attain a phase contrast. This latter method and system results, particularly in combination with the first described devices, in notably excellent phase contrast pictures.

The primary advantage of the inventive method and apparatus over the phase microscopes of the prior art consists in the considerable simplification of the apparatus and its operation. For instance, it is no longer necessary to center the system after each change of the objective since the proper viewing conditions are obtainable merely by the adjustment of the vertical position of the condenser. The objectives also require no longer special means, such as phase plates or polarizing means.

It is a special advantage of the present method and system to enable the observer to obtain different microscopic pictures of the same object in immediate succession by merely moving the condenser along the optical axis. By moving the condenser away from the object, a dark-field is obtained, then a phase contrast, and finally a bright-field illumination.

In case of the use of an immersion objective, a plano-convex collecting lens is interposed between the condenser and the slide of the microscope, the plane side of the collecting lens being connected to the slide by means of an immersion fluid. This intermediate lens is not movable with the condenser.

The above objects, features and advantages of the present invention will become more apparent from the following detailed description taken in connection with the accompanying drawing which is merely illustrative of some embodiments of the invention, and in which:

Fig. 1 shows a microscope, partially in section, embodying the present invention;

Fig. 1a shows a specific condenser construction; and

Figs. 2 to 6 show the condenser of Fig. 1, enlarged, in different phases of operation.

Figure 1B:
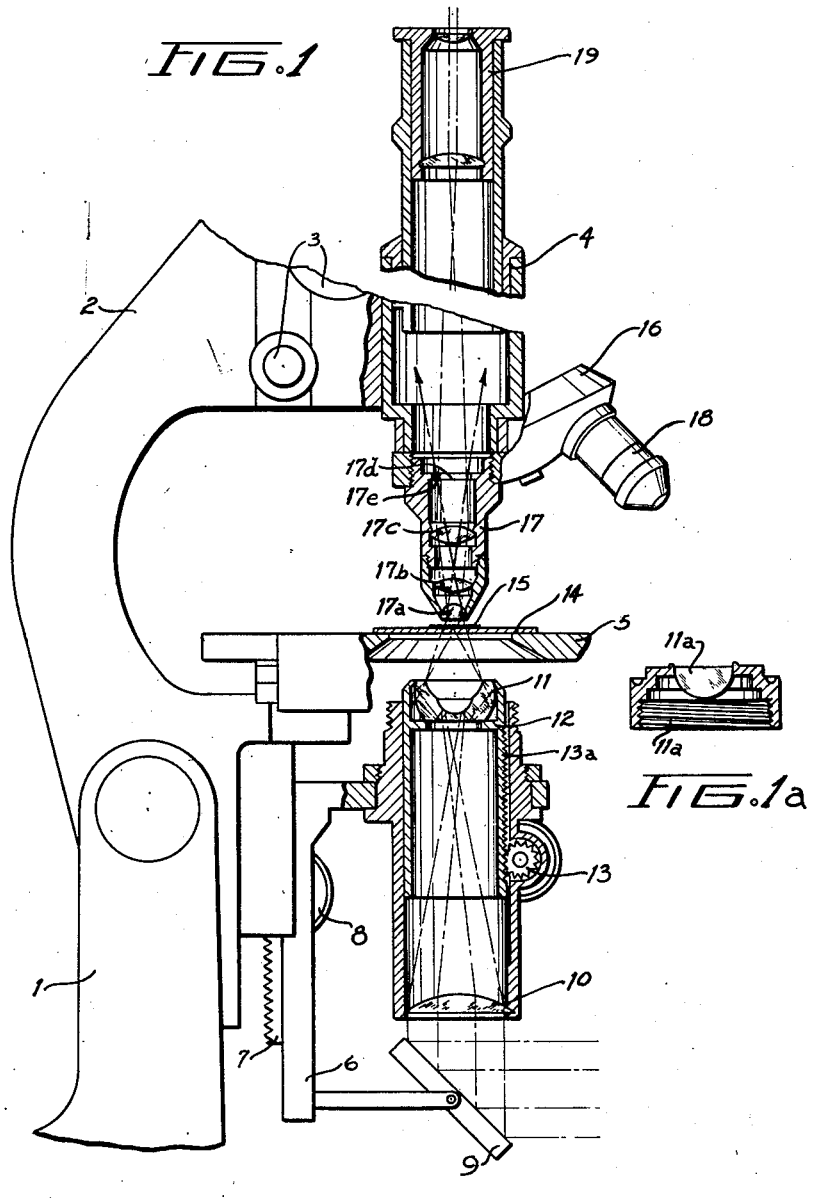
Fig. 1b shows a top view of an iris diaphragm in the exit pupil.
Figure 1B:
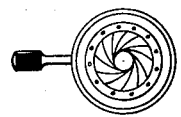

Referring now to Fig. 1, there is shown a conventional microscope comprising stand 1 (partly shown), arm 2 (partly shown) with focusing device 3, tubus 4 (broken), stage 5 and illuminating apparatus 6 which is vertically adjustable by means of rack and pinion 7, 8. A collector lens 10 is arranged above mirror 9, the collector lens throwing the light beams upon condenser 11. The condenser is movable along the optical axis of the microscope by means of rack and pinion 13, 13a. Condenser 11 may also be supplemented by lens 11a, as shown in Fig. 1a or 3. Stage 5 carries slide 14 with object 15, above which there is arranged objective 17 carried by revolving nose piece 16, which also carries objective 18. At the upper end of tubus 4 is eyepiece 19. Objective 17 consists essentially of three lens groups 17a, b, c and the exit pupil 17d which is located in the rear focal plane and comprises diaphragm 17e.

The illuminating light is reflected by mirror 9 toward collector lens 10 which converges the light beams on condenser 11. The light beams emerging from the condenser illuminate the object 15 which is observed through objective 17 and eyepiece 19.

Figs. 2 through 6 show condenser 11 in various phases of operation. In Figs. 2, 4 and 6, an objective having a medium focal length is utilized; in Fig. 3, a short focal length immersion objective is used; and Fig. 5 shows a weakly magnifying objective having a long focal length. All three kinds of objectives are represented merely by their lens of incidence, 17e, 25a and 18a, respectively, the construction of the objectives being known per se and the position of the diffraction image of the base in respect to the exit pupil being analogous to that shown in Fig. 1.

The condenser shown in the drawing is a modification of a known dark-field condenser and all surfaces shown in double lines are reflective so that the illuminating light beams can enter and emerge only through zones 20 and 21. Divergent beams entering through lower aperture 20 are partly reflected or absorbed, and partly they leave the condenser in two rather sharply separated light bundles. As shown in Figure 2, one of these bundles, designated as 22, is twice reflected in the condenser, if focused in object 15 and produces a dark-field illumination. The second light bundle 23, see Figs. 3 to 6, produces both the phase contrast and bright-field illumination of the object, depending on the vertical position of the condenser. As shown, light bundle 23 is formed by triple reflection of the entering light beam in the condenser and focusing thereof in the very narrow annulus 24 which becomes the basis of bundle 23.

In Fig. 2, where the condenser is near the object, only light bundle 22 is effective so that the object is seen in dark-field illumination. As the condenser is lowered, as shown in Fig. 4, the object is illuminated by light bundle 23 of which lens 17a admits the field 23a, as indicated in the drawing by shading. This is the light bundle which creates the diffraction image of base 24 in exit pupil 17d in the proper position to produce a phase contrast. If the condenser is lowered still further, as shown in Fig. 6, a different field 23b of light bundle 23 impinges upon lens 17a whereby the diffraction image of base 24 is moved from the rim of exit pupil 17d toward the center and a pure bright-field illumination is produced.

Fig. 3 shows the embodiment of the invention in connection with an immersion objective where lens 11a is interposed and connected with slide 14 by means of an immersion fluid. In this figure, the condenser is shown in a higher position than in Fig. 4. From the entire light bundle, only light field 23c is admitted by lens 25a whereby the diffraction image of base 24 is also thrown on the exit pupil of the objective in its proper location.

Finally, Fig. 5 shows that in the case of weakly magnifying objective 18, condenser 11 must be considerably lowered to bring the diffraction image of the base into proper focus in respect to the exit pupil. As shown, field 23e impinges upon lens 18a.

It is obvious that, by proper vertical adjustment of the condenser, dark-field as well as bright-field illumination may also be produced with the objectives shown in Figs. 3 and 5. The corresponding phases have merely been omitted to simplify the drawing. It will also be clear to the expert that the invention is by no means limited to the specified condenser shown and that it is possible to use, for instance, a condenser as disclosed and shown in U. S. Patent No. 2,130,494 by arranging it simply as a bright-field condenser under the object.

While the invention has been described in detail with reference to the embodiments shown in the drawing, it is to be clearly understood that various modifications may occur to those skilled in the art without departure from the spirit and scope of the invention as defined and limited in the appended claims.

What is claimed is:

1. A device for producing a phase contrast when examining a microscopic object with an objective having an exit pupil limited by a circular aperture diaphragm, comprising a condenser forming an annular caustic of light and means for adjusting the relative distance between the annular light caustic and the objective whereby the size of the image of the caustic projected by the objective is changeable, the adjustment of the condenser providing an image of the caustic which, when partially obturated by the aperture diaphragm, produces a phase difference between light rays not diffracted by the object and light rays diffracted by the object.

2. A device as defined in claim 1, in which the diaphragm comprises an adjustable iris diaphragm.

3. A device as defined in claim 1, in which the diaphragm comprises a fixed annular non-transparent zone.

4. A device for producing a phase contrast as defined in claim 1, wherein the condenser has a central surface of incidence for light beams, a central surface of emergence for said light beams, and means for focusing the incident light beams in an annular caustic, said means including an inner curved reflecting surface positioned behind the incidence surface, an outer curved reflecting surface surrounding the inner reflecting surface and receiving light beams reflected thereby, and an annular curved transparent surface receiving light beams from the outer reflecting surface and focusing them in an annular caustic in the region of the central surface of emergence.

5. A device as defined in claim 4, in which the diaphragm comprises an adjustable iris diaphragm.

6. A device as defined in claim 4, in which the diaphragm comprises a fixed annular non-transparent zone.

References Cited in the file of this patent

UNITED STATES PATENTS

| Number | Name | Date |
| --- | --- | --- |
| 1,613,583 | Berek | Jan. 4, 1927 |
| 1,985,074 | Bauersfeld | Dec. 18, 1934 |
| 2,097,494 | Lihotzky | Nov. 2, 1937 |
| 2,373,559 | Hall | Apr. 10, 1945 |
| 2,415,732 | Domingo | Feb. 11, 1947 |
| 2,427,689 | Osterberg et al. | Sept. 23, 1947 |

FOREIGN PATENTS

| Number | Country | Date |
| --- | --- | --- |
| 631,251 | Great Britain | Oct. 31, 1949 |